G. A. SLEIGHT.
FAN PULLEY WHEEL AND CRANK RATCHET.
APPLICATION FILED AUG. 13, 1921.
1,426,227.
Patented Aug. 15, 1922.
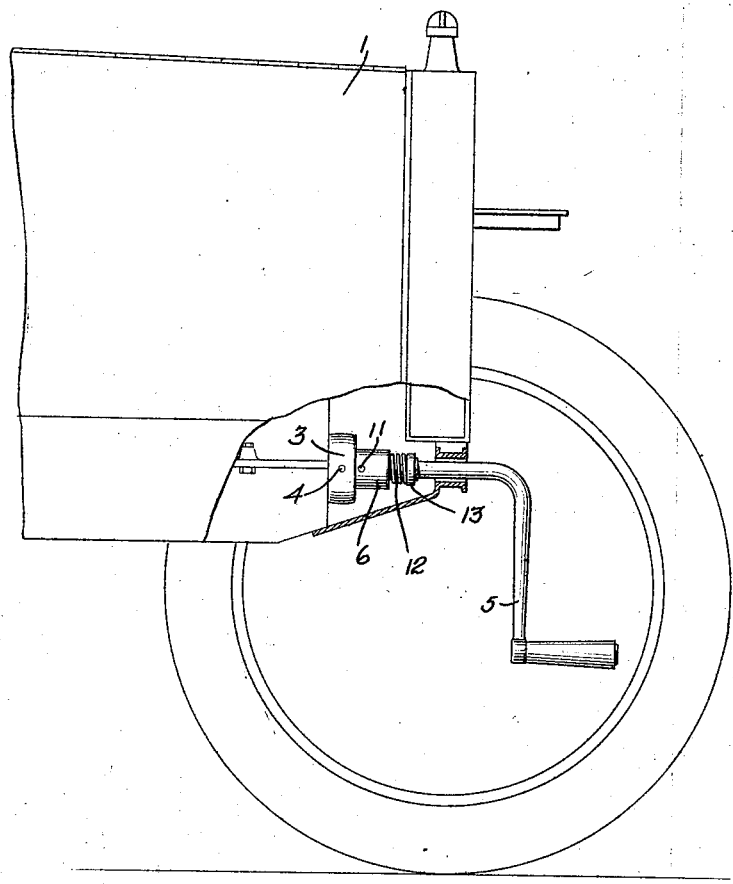
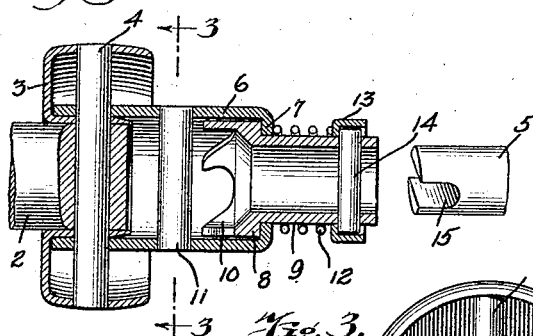
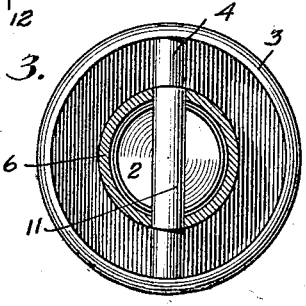
WITNESSES
INVENTOR
GEORGE A. SLEIGHT
BY
ATTORNEYS

UNITED STATES PATENT OFFICE.

GEORGE A. SLEIGHT, OF HYDE PARK, NEW YORK.

FAN-PULLEY WHEEL AND CRANK RATCHET.

1,426,227.          Specification of Letters Patent.    Patented Aug. 15, 1922.

Application filed August 13, 1921. Serial No. 492,001.

*To all whom it may concern:*

Be it known that I, GEORGE A. SLEIGHT, a citizen of the United States, and a resident of Hyde Park, in the county of Dutchess and State of New York, have invented a new and Improved Fan-Pulley Wheel and Crank Ratchet, of which the following is a full, clear, and exact description.

This invention relates to cranking mechanism for Ford automobiles and has for an object to provide an improved ratchet and fan wheel wherein an easy starting may be had through the use of a removable crank.

Another object of the invention is to provide a starting ratchet for movable cranks whereby the crank acts as means for setting the starting mechanism and then actuating the same.

In the accompanying drawing—

Figure 1 is a fragmentary view, certain parts broken away showing part of a Ford automobile with a device embodying the invention applied thereto.

Figure 2 is an enlarged longitudinal vertical sectional view through the attachment shown in Figure 1.

Figure 3 is a transverse sectional view through Figure 2 on line 3—3.

Figure 4 is a view similar to Figure 2 but showing a slight modified construction.

Referring to the accompanying drawing by numerals, 1 indicates an automobile which is provided with an engine having a crank shaft 2 carrying a pulley wheel 3 held in place by a pin 4. The pulley wheel 3 is adapted to receive a belt for driving a fan in a well known manner. Heretofore, the shaft 2 in the case of Ford automobiles has extended beyond the pulley 3 and co-acts with a crank permanently connected up to be brought into engagement therewith at any time for turning over the engine. Where self-starters have been used, this permanent retention of the crank is unnecessary and sometimes may be objectionable.

In the present instance, it is aimed to provide a device wherein the crank 5 may be used at any time and when not in use may be placed in the tool chest or at some other convenient point. When a device embodying the invention is used, the crank 5 may not be used except on rare occasions when the self-starter has failed to operate. As shown in Figure 2, a tubular member 6 is provided having turned in shoulders 7 for engaging the shoulders 8 of a clutch sleeve 9, which sleeve not only merges into the shoulders 8 but into a clutch structure 10 adapted to engage or interlock with the pin 11 when the sleeve 9 is pushed inwardly against the action of spring 12. When this has been done, the engine may be readily turned over as the pin 11 is carried by the tubular member 6 and said tubular member is secured to crank shaft 2 by pin 4. A washer 13 surrounds the tubular member 12 and overlaps the pin 14 extending therethrough whereby the pin cannot become accidentally disengaged and continually acts as means for accommodating the notched end 15 of the crank 5.

Whenever it is desired to start the engine of the crank 5, said crank is placed in position as shown in Figure 1 and when in this position the notched end 15 is straddling the pin 14. The crank 5 is then moved inwardly against the action of spring 12 until the clutch structure 10 is engaging the pin 11. The crank is then turned over in the usual manner. After the engine is started, crank 5 is merely pulled out and stored away.

In some instances, it might be desired to make the tubular member 6 and the pulley 3 integral. When the parts are made as just described, they will appear as shown in Figure 4 and the pin 14 will pass through the combined pulley 3 and sleeve 6 as heretofore described. In old machines the tubular member 6 may be slipped in place as shown in Figure 2 without molesting the old pulley 3. During the manufacture of a new machine, preferably the combined arrangement as shown in Figure 4 is used.

What I claim is:—

1. A combined pulley and crank ratchet comprising a pulley, means for connecting the same to a crank shaft, a sleeve connected to said crank shaft by the same means as the pulley, a clutch carried by said sleeve, and a notched crank for actuating said clutch.

2. In a device of the character described a sleeve adapted to be connected with a crank shaft, a clutch mechanism carried by said sleeve, said clutch mechanism including a pin, and a notched crank for engaging said pin and causing the clutch mechanism to be moved to an operative position whereby said crank may turn over said crank shaft.

3. A device of the character described comprising a tubular member, means for connecting the same to the crank shaft, a pin carried by said tubular member, a reciprocating clutch member carried by said tubular member, a spring for normally holding said clutch member out of engagement with said pin, and means including the crank for moving the clutch member into engagement with said pin and turning the same for turning over said crank shaft.

4. A combined fan pulley and crank ratchet comprising a pulley merging into a tubular extension, a pin carried by said tubular extension, a clutch member carried by said tubular extension, a spring for normally holding said clutch member out of engagement with said pin, and a crank receiving pin carried by said clutch member whereby the clutch member may be moved against the action of said spring and into engagement with the first mentioned pin for turning over said crank.

5. A fan pulley and crank ratchet for crank shafts of engines comprising a pulley, a tubular member overlapping the hub of said pulley, a pin extending through said pulley, said tubular member and part of said crank shaft, a clutch pin carried by said tubular member, a clutch member carried by said tubular member, a spring for normally holding said clutch member out of engagement with said pin, and a crank receiving pin carried by said clutch member.

6. A fan pulley and crank ratchet for crank shafts of engines comprising a pulley, a tubular member extending from said pulley, means for rigidly connecting said pulley and said tubular member with said crank shaft, a clutch pin carried by said tubular member, a clutch member carried by said tubular member, a spring for normally holding said clutch member out of engagement with said clutch pin, and a crank receiving pin carried by said clutch member.

7. A ratchet for crank shafts of engines comprising a tubular member, means for connecting the same with a crank shaft, a clutch pin carried by said tubular member, a clutch member carried by said tubular member, a spring for normally holding said clutch member out of engagement with said clutch pin, and a crank receiving pin carried by said clutch member.

8. In a device of the character described, a tubular member having an inturned flange at one end, means for connecting the other end with the crank shaft of an engine, a clutch pin carried by said tubular member, a clutch member having a head fitting in said tubular member normally resting against said inturned flange, said clutch member being also formed with an extension projecting through said inturned flange, a spring for resiliently holding said head against said inturned flange, and a crank receiving member carried by said extension.

GEORGE A. SLEIGHT.